April 27, 1926.
J. E. R. HAYES
1,582,600
MEANS FOR INDICATING CONDITIONS WITHIN THE RADIATOR OF A COMBUSTION ENGINE
Filed Jan. 19, 1924
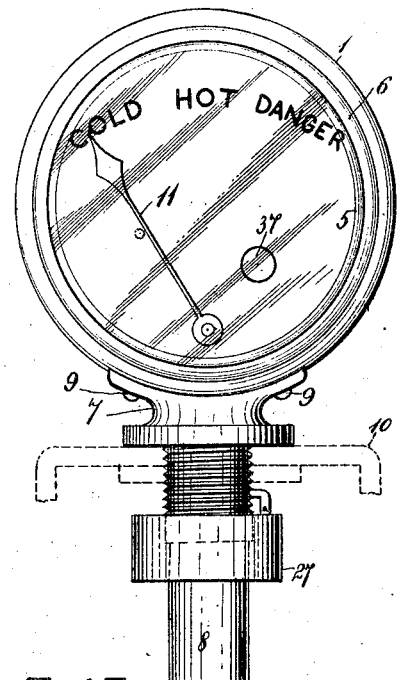
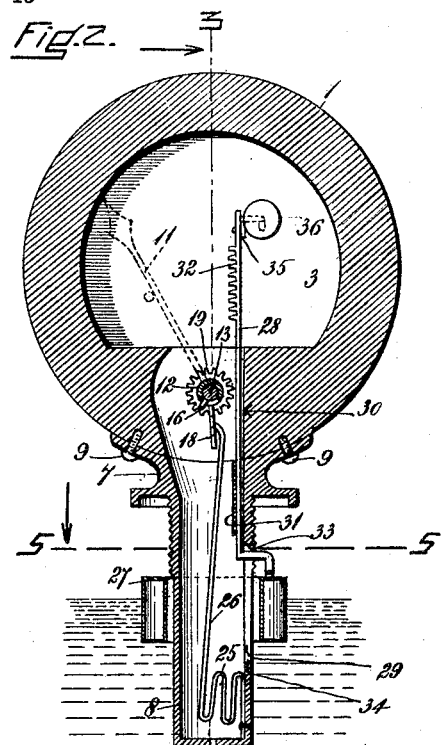
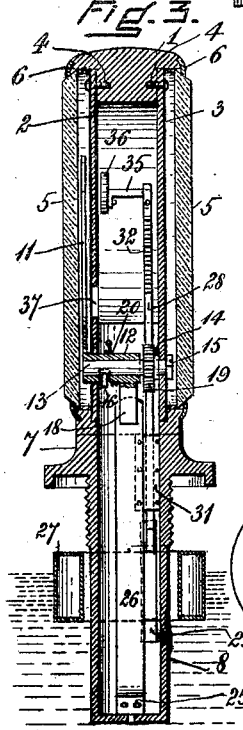
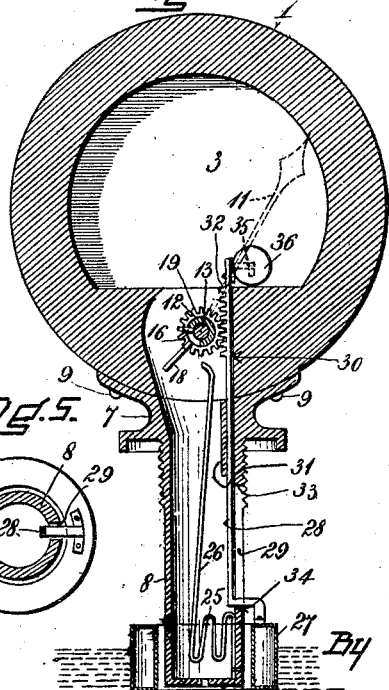
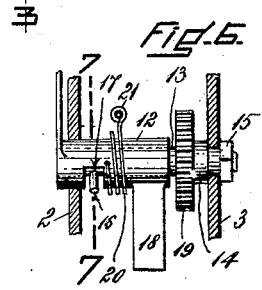

Patented Apr. 27, 1926.

1,582,600

UNITED STATES PATENT OFFICE.

JOHN E. R. HAYES, OF MELROSE, MASSACHUSETTS.

MEANS FOR INDICATING CONDITIONS WITHIN THE RADIATOR OF A COMBUSTION ENGINE.

Application filed January 19, 1924. Serial No. 687,338.

*To all whom it may concern:*

Be it known that I, JOHN E. R. HAYES, a resident of Melrose, in the county of Middlesex and State of Massachusetts, a citizen of the United States, have invented a new and useful Improvement in Means for Indicating Conditions Within the Radiator of a Combustion Engine, of which the following is a full, clear, and exact description, reference being had to the accompanying drawings, forming a part of this specification, in explaining its nature.

The present invention relates to an improvement in indicators useful in connections where thermal and water indications are desired, and especially adaptable for use in connection with a radiator forming part of the circulatory system of combustion engines.

Among the objects of the invention are the following:—

To provide a combination heat and water indicator;

To provide means whereby the heat indicator will give a proper indication of variations in heat conditions as long as an adequate supply of water is in the radiator;

To provide means whereby the heat indicator will cease to function when an inadequate supply of water is in the radiator;

To provide means whereby the water indicator will give an indication of an inadequate supply of water in the radiator whether it be hot or cold;

To provide means whereby the heat and water indications may be shown by an indicating hand common to both.

The invention can best be seen and understood by reference to the drawings, in which—

Figure 1 is a front elevation of the device.

Fig. 2 is a vertical section in elevation.

Fig. 3 is a section on the line 3—3 of Fig. 2.

Fig. 4 is a section like Fig. 2 excepting that certain of the parts are occupying a change in position.

Fig. 5 is a section on the line 5—5 of Fig. 2.

Fig. 6 is a plan of a detail of construction, and

Fig. 7 is a section on the line 7—7 of Fig. 6.

1 represents the casing of the indicator within which is contained the indicating mechanism later to be referred to.

The casing comprises a substantially annular shell or casting. Its opposite flat sides are recessed to contain plates 2 and 3, respectively, of which the front plate 2 is a dial plate. Both plates are fastened to the casing by screws 4 as shown.

Arranged outside the plates 2 and 3 and spaced, respectively, therefrom are glasses 5, 5, held in place attached to the casing by clamping rings 6.

The under side of the casing is provided with a hollow fixture 7 from which depends a hollow shank 8. The fixture 7 is attached to the casing by screws 9. The shank 8 is adapted to pass through a radiator cap 10 (attachable in the usual manner to a radiator, not shown), and the shank is exteriorly threaded in part by which its attachment and that of the entire indicator is secured to the cap.

Pivotally arranged within the casing is an indicating hand 11 adapted to turn on an arc over the face of the dial by which it may indicate different readings thereon. The indicating hand is attached to a sleeve 12 which is mounted upon a rotary shaft 13.

The shaft 13 extends through the plate 3 on the rear side of the casing and is journaled to turn therein. The shaft is maintained against endwise displacement by a flange 14 on the shaft with bearing against the inner side of the plate 3 and by a threaded nut 15 on the end of the shaft with bearing against the outer side of the same plate. Both the shaft and sleeve extend through the dial plate 2 on the inner side of the casing, the sleeve being mounted to turn thereon. Endwise displacement of the sleeve in relation to the shaft is prevented by a pin 16 fixed to the shaft extending into a segmental cut 17 in the sleeve. To this pin and segmental cut further reference will later be made.

Depending from the under side of the sleeve is a finger 18 by which the sleeve may be turned. Located upon the shaft 13, between the end of the sleeve and the plate 3, is a gear 19 by which the shaft may be turned.

In order that the indicating hand may be held in and return to a normal retracted or zero position, there is wrapped around the sleeve a coiled spring 20 one end of which is secured to the sleeve and its other end fastened to the interior of the casing by a pin 21.

While the indicating hand is fixed to the sleeve 12, the arrangement is such that the hand may be moved over the face of the dial not only by an application of power to the finger 18 for turning the sleeve, but, also, by an application of power to the gear 19 for turning the shaft. To this end the sleeve is provided with the segmental cut 17 before noted, 22, 23 representing the ends of the cut in a circumferential direction in relation to the shaft. The location of the pin 16 on the shaft in relation to the segmental cut is such that when the indicating hand is occupying its retracted or zero position the pin will lie just adjacent the end 22 of the cut. With the pin thus arranged, upon an application of power to the finger 18 for turning the sleeve and moving the indicating hand, the hand will be enabled to describe the arc of movement afforded it. During such movement the sleeve on account of the segmental cut in it will turn relatively to the pin, the sleeve turning by the pin. On the other hand, the indicating hand may be turned by an application of power to the gear 19. On an application of power for turning this gear in a clockwise direction the shaft will be turned in like direction bringing the pin in contact with the end 22 of the segmental cut in the sleeve, thereby turning the sleeve and moving the indicating hand over the face of the dial.

Separate elements are employed for operating the indicating hand, one element responsive to thermal changes within the radiator in connection with which the device is used and the other an element responsive to changes in the amount of water within the radiator.

The element responsive to thermal changes comprises a thermostatic device 25 of well known type secured to the hollow shank 8 and having an arm 26 with bearing against the finger 18 on the sleeve. The device 25 is preferably located well down inside the shank in order that it may be responsive to changes in the thermal condition of the water in the radiator, the shank being of such determinate length as will secure this end.

The element responsive to changes in the amount of water within the radiator comprises a float 27 preferably annular in form and arranged outside the shank 8 loosely encircling the same. Secured to the float 27 is a float arm 28 preferably bent to extend through a slot 29 in the side of the shank 8 and thence upwardly through the hollow of the shank by the gear 19 and between this gear and the adjacent side 30 of the casing and beyond the same into the interior of the chamber of the casing. The arm is maintained against else than a vertical movement by a guide 31 attached to the side of the shank through which the arm extends. The arm bears on its upper end a rack 32 arranged on the side thereof facing the gear 19 and is adapted to engage this gear for turning the same in a clockwise direction when the arm has dropped a determinate amount.

The float 27 and float arm carried by it have a permitted vertical movement within the limits afforded by the slot 29, the ends 33 and 34 of this slot defining the movements of the float and arm by contact of the bent portion of the arm respectively therewith. The slot 29 may be of any determinate length depending upon the extent of movement desired to be imparted to the float and arm. In any event the arrangement is such that an appreciable drop is permitted the float and float arm from their raised position and upon the occurrence of such drop the rack upon the float arm will be brought into engagement with the gear 19 for turning it as aforesaid.

Preferably attached to the top end of the float arm 28 is a bent arm 35 carrying a disk 36. This disk is adapted to register with and be seen through an opening 37 cut in the dial plate when the float and float arm have reached the limit of the drop afforded them.

The operation is as follows:—

It will first be assumed that the indicator is in place on the radiator and that the radiator is filled with a proper amount of water. The float 27 will then be lifted to substantially the limit of its raised position, thereby elevating the float arm and locating the rack in a position well above the gear 19. When the float is thus positioned and as long as a proper amount of water remains in the radiator the thermostatic device 25 will function in the usual manner and as different degrees of heat are attained within the radiator the arm 26 thereof, by its bearing against the finger 18 on the sleeve 12, will operate to turn the indicating hand over the face of the dial and make proper register thereon. In other words, as long as a proper amount of water remains in the radiator the thermal indicating device will register in the usual manner variations of heat. When, however, the water in the radiator has lowered to a point where there is no longer a proper amount of water therein, whether the radiator be hot or cold, the fall of the float will bring the rack 32 into operative engagement with the gear 19 and thereby move the indicating hand over the face of the dial. The arrangement of the parts is preferably such that the rack will be brought into operative engagement with the gear only when the water in the radiator has lowered to a dangerous point and the action of the rack upon the gear will then be a relatively quick action to move the indicating hand over the face of the dial to a point indicating danger. As soon as the parts begin to operate for moving the indicating hand on account of the lack of water, the thermal connection will then be immediately cut off for the reason that the finger 18 will then turn away from the end of the arm 26 of the thermostatic device.

When the radiator is cold and the operator notes that the indicating hand is not occupying its zero or initial position, but has been moved over the face of the dial, he will know at once that an insufficiency of water is in the radiator. When the radiator is hot during the running of the engine and the indicating hand has been moved to a point indicating danger, the operator will know whether or not such indication is on account of the lack of water by the disk 36 which may be observed through the opening 37 in the dial.

Having thus fully described my invention, I claim and desire to secure by Letters Patent of the United States:—

1. In an indicator for indicating conditions within the radiator of a combustion engine, a temperature-indicating means adapted to be located outside the radiator, an element responsive to thermal changes adapted to be located within the radiator and operatively connected to said indicating means, an element adapted to be located within the radiator responsive to changes in the amount of water within the radiator, means whereby said last-named element will break the operative connection between said indicating means and the said element responsive to thermal changes depending upon determinate change in the amount of water in the radiator, and means located outside the radiator actuated by the element located within the radiator responsive to changes in the amount of water within the radiator for giving an indication of the water content of the radiator in the event of a break in the operative connection between said indicating means and the said element responsive to thermal changes.

2. In an indicator for indicating conditions within the radiator of a combustion engine, a temperature-indicating means adapted to be located outside the radiator, an element responsive to thermal changes adapted to be located within the radiator and operatively connected to said indicating means, an element adapted to be located within the radiator responsive to changes in the amount of water within the radiator, and means whereby said last-named element will become operatively connected to said indicating means depending upon determinate change in the amount of water in the radiator.

3. In an indicator for indicating conditions within the radiator of a combustion engine, a temperature-indicating means adapted to be located outside the radiator, an element responsive to thermal changes adapted to be located within the radiator and operatively connected to said indicating means, an element adapted to be located within the radiator responsive to changes in the amount of water within the radiator, and means whereby said last-named element will break the operative connection between said indicating means and said element responsive to thermal changes and have operative connection with said indicating means depending upon determinate change in the amount of water in the radiator.

4. In an indicator, the combination comprising a temperature-indicating means, an element responsive to thermal changes operatively connected to said indicating means, a float responsive by change in position to a change in the level of water in which the float is contained, means whereby said float will break the operative connection between said indicating means and the said element responsive to thermal changes upon a determinate change in position incurred by a determinate change in the level of water in which the float may be contained, and means located outside the radiator actuated by the float for giving an indication of the water content of the radiator in the event of a break in the operative connection between said indicating means and the said element responsive to thermal changes.

5. In an indicator, the combination comprising a temperature-indicating means, an element responsive to thermal changes operatively connected to said indicating means, a float responsive by change in position to a change in the level of water in which the float is contained, and means whereby said float will become operatively connected to said indicating means upon a determinate change in the position of said float incurred by a determinate change in the level of water in which the float may be contained.

6. In an indicator the combination comprising a temperature-indicating means, an element responsive to thermal changes operatively connected to said indicating means, a float responsive by change in position to a change in the level of water in which the float is contained, and means whereby said float will break the operative connection between said indicating means and said element responsive to thermal changes and have operative connection with said indicating means upon a determinate change in the level of water in which the float may be contained.

7. In a device of the type specified for indicating conditions within the radiator of a combustion engine, a temperature-indicating means adapted to be located outside the radiator, an element responsive to thermal changes adapted to be located within the radiator and operatively connected to said indicating means, a float adapted to be located in the radiator, means whereby said float will be operatively connected to said indicating means for operating the same depending upon a determinate change in the amount of water in the radiator in which the float may be contained, and other means controlled by said float for indicating outside the radiator in which the float may be contained a change in the position of said float.

8. In an indicator, the combination comprising an indicating hand, means whereby said hand may be independently operated by separate elements, an element responsive to thermal changes comprising one of said elements operatively connected with said means, and an element responsive to changes in water level comprising the other element operatively connected with said means under determinate conditions.

9. In an indicator, the combination comprising an indicating means, mechanism whereby said indicating means may be operated by separate elements, an element responsive to thermal changes comprising one of said elements operatively connecting with said mechanism, and a water float comprising the other element operatively connecting with said mechanism under determinate conditions.

10. In an indicator, the combination comprising an indicating hand, a rotary mounting for said hand, an element responsive to thermal changes having operative connection with said mounting, a float, and means whereby said float will become operatively connected with said mounting under determinate conditions.

11. In an indicator, the combination comprising an indicating hand, mechanism whereby said hand may be operated independently by application of power to one or the other of separate parts of said mechanism, an element responsive to thermal changes operatively connected to one of said parts, a float, and means whereby said float will under determinate conditions be operatively connected to the other of said parts and break the operative connection of said element responsive to thermal changes with said mechanism.

12. In an indicator, the combination comprising a casing, an indicating hand, a rotary shaft mounted upon said casing, a sleeve mounted to turn upon said shaft and carrying said indicating hand, means whereby said indicating hand will be turned by the turning of either said sleeve or said shaft, elements carried by said sleeve and shaft, respectively, by which the same may be turned, an element responsive to thermal changes operatively connected to the element for turning said sleeve, a mounting for said element responsive to thermal changes, a float, and means whereby said float will be operatively connected to the element for turning said shaft under determinate conditions.

13. In an indicator, the combination comprising a casing, an indicating hand, a rotary shaft mounted upon said casing, a sleeve mounted to turn upon said shaft and carrying said indicating hand, means whereby said indicating hand will be turned by the turning of either said sleeve or said shaft, a finger on said sleeve, a gear upon said shaft, an element responsive to thermal changes in operative connection with said finger, a mounting for said element responsive to thermal changes, a float, a float arm and rack carried thereby adapted and arranged whereby said rack will engage said gear for turning the same under determinate conditions.

JOHN E. R. HAYES.